(12) United States Patent
Von Andrian (10) Patent No.: US 6,977,118 B1
(45) Date of Patent: Dec. 20, 2005

(54) OPTIMIZATION OF THE OPERATING PARAMETERS OF A DIRECT METHANOL FUEL CELL SYSTEM

(75) Inventor: Stefanie Von Andrian, Fellbach (DE)

(73) Assignee: Forschungszentrum Julich GmbH, Julich (DE)

( * ) Notice: Subject to any disclaimer, the term of this patent is extended or adjusted under 35 U.S.C. 154(b) by 444 days.

(21) Appl. No.: 10/048,297

(22) PCT Filed: Oct. 4, 2000

(86) PCT No.: PCT/EP00/09692

§ 371 (c)(1),
(2), (4) Date: Jan. 24, 2002

(87) PCT Pub. No.: WO01/33654

PCT Pub. Date: May 10, 2001

(30) Foreign Application Priority Data

Oct. 30, 1999 (DE) ................................ 199 52 384

(51) Int. Cl.[7] .............................................. H01M 8/00
(52) U.S. Cl. .......................................... 429/13; 429/17
(58) Field of Search ............................. 429/13, 17, 24, 429/25, 26

(56) References Cited

U.S. PATENT DOCUMENTS

| | | | | |
|---|---|---|---|---|
| 4,362,788 A | * | 12/1982 | Maru et al. .................... | 429/13 |
| 5,441,819 A | * | 8/1995 | Voss et al. ..................... | 429/13 |
| 6,759,153 B1 | * | 7/2004 | Lamm et al. ................... | 429/13 |

FOREIGN PATENT DOCUMENTS

| DE | 42 01 795 A | 7/1993 |
|---|---|---|
| DE | 196 29 265 A | 1/1998 |

* cited by examiner

*Primary Examiner*—Bruce F. Bell
(74) *Attorney, Agent, or Firm*—Merchant & Gould P.C.

(57) ABSTRACT

The invention relates to a method of optimizing the operating parameters (cathode pressure and operating temperature) in a low-temperature fuel cell. The parameters are selected in such a way that on the one hand, the maximum system efficiency which can be achieved in practice is essentially attained, and on the other hand, waste heat is produced by the fuel cell so that no external heat supply is required for operation. The method relates to operation with liquid fuel. The waste heat produced by the fuel cell amounts at a maximum to half of the electrical energy produced by the fuel cell.

2 Claims, 14 Drawing Sheets

OPTIMIZATION OF THE OPERATING PARAMETERS OF A DIRECT METHANOL FUEL CELL SYSTEM

The invention relates to a fuel cell stack in which a plurality of fuel cells are mechanically and electrically connected together.

DE 44 30 958 C1 and DE 195 31 852 C1 disclose fuel cells having a cathode, an electrolyte and an anode. An oxidation agent (for example air) is fed into a chamber or passage adjoining the cathode and fuel (for example hydrogen) is fed into a chamber or passage adjoining the anode.

The operating agents pass to the electrodes and are depleted there. The depleted operating agents then issue again and are passed out of the fuel cell.

At the anode of the fuel cell known from DE 195 31 852 C1 protons are formed in the presence of the fuel by means of a catalyst. The protons pass through the diaphragm (electrolyte) and are combined on the cathode side with the oxygen originating from the oxidation agent to form water. The electrons are liberated at the anode and consumed at the cathode and electrical energy is generated in that way.

The efficiency of a fuel cell depends inter alia on the operating conditions. They include in particular the pressure obtaining on the anode and cathode side, the temperature and the operating agents used. In order to arrive at good power levels for a low-temperature fuel cell which is operated with liquid fuel such as methanol, it is known for the pressure on the anode and cathode side and the temperature to be so adjusted that the electrical power generated by the fuel cell is at a maximum.

The above-indicated approach however disregards the fact that maximising the electrical power generated does not in any way result in an optimum level of efficiency. More specifically, account is to be taken of which power aspects have to be afforded in order to operate the fuel cell. Thus, a pump power has to be afforded to generate an increased pressure on the cathode or anode side. Such a power to be used is to be subtracted inter alia from the electrical power produced in order to ascertain the nett power produced by the fuel cell.

The object of the invention is to provide a method of setting operating conditions in a low-temperature fuel cell, so that efficient operation of a fuel cell is possible.

The object of the invention is attained by a method having the features of the first claim. Advantageous configurations are set forth in the appendant claims.

In terms of the method involved, the pressure on the cathode side and the operating temperature of the fuel cell or a fuel cell stack are so set that the fuel cell produces waste heat and at the same time a level of system efficiency is achieved, which substantially corresponds to the maximum which can be achieved in practice.

The term pressure on the cathode side is used to denote the pressure which obtains in the cathode space of a fuel cell. The cathode space is the space in which a cathode is disposed.

The term operating temperature is used to denote the mean temperature in a fuel cell or in the fuel cell stack, which obtains during operation.

The term system efficiency $\eta$ is used to denote the nett power divided by the substance flow of fuel (molar amount per unit of time) and divided by the lower calorific value of the fuel used. The lower calorific value $H_u$ is the energy which is liberated when the fuel is completely converted into water in vapor form in the fuel cell.

The term nett power $P_{nett}$ is used to denote the electrical power produced by the fuel cell less the power which has to be applied for operation of the fuel cell.

The term waste heat is used to denote the energy produced by the fuel cell, less the electrical energy produced by the fuel cell, less the heat energy which is used by the fuel cell to reach or hold the operating temperature, and less the applied enthalpy of evaporation for the water occurring on the cathode side. The waste heat is accordingly the amount of heat which is given off to the environment by the fuel cell.

The method concerns a fuel cell which is operated with liquid fuel.

In terms of the method the parameters comprising the pressure on the cathode side and the operating temperature are in particular to be so set that:

1. waste heat is produced and same does not exceed half the value of the electrical power produced by the fuel cell. If the electrical power produced by the fuel cell is for example 80 KW, the waste heat is between 0 and 40 KW.

2. The pressure and the temperature are so selected that the maximum system efficiency $\eta_{system}$ which can be achieved in practice is at least 90% attained.

Waste heat falls with rising voltage while the power increases. Desirably therefore a cell voltage is predetermined. That is usually around 500 mV. The other settings are then ascertained in relation to the constant cell voltage.

The method according to the invention has the substantial advantage over the state of the art that in particular also waste heat is taken into consideration, when optimising pressure and temperature. If no waste heat is produced by the fuel cell then external heat has to be fed to the fuel cell for operation thereof. Under those conditions, operation in a meaningful manner from the energy point of view is not possible. Consequently in accordance with the invention a mode of operation which is meaningful in energy terms is ensured.

Furthermore the invention takes account of the level of system efficiency. That also ensures that the operating temperature and the cathode pressure are set in an improved fashion in comparison with the above-mentioned state of the art.

It has further been found that, besides the operating temperature, the pressure on the cathode side is particularly important for achieving optimum levels of power. In terms of the method therefore the parameters which are essential for operation of a fuel cell are taken into account. For that reason also the method is particularly suitable for permitting efficient operation of a fuel cell.

The underlying basics of the invention are discussed in greater detail hereinafter.

The assessment program PROVISION from SimSci is used for process-engineering modelling of the direct methanol fuel cell system. Various components make it possible to depict process-engineering steps in relation to their mass and energy balance sheets and produce flow charts. The program is suitable exclusively for stationary process considerations. For the fuel cell, a process-engineering equivalent circuit diagram was drawn up, which makes it possible to represent the performance thereof in conjunction with the overall system.

A liquid methanol/water mixture is fed to the anode. The methanol oxidises at the anode ideally to form carbon dioxide:

$CH_3OH + H_2O \rightarrow CO_2 + 6H^+ + 6e^-$

In the cathode reaction the protons which have migrated through the electrolyte react with the electrons and oxygen in the air to form water:

$$6H^+ + 6e^- + \frac{3}{2}O_2 \rightarrow 3H_2O$$

That involves the following gross reaction for methanol oxidation (with a free reaction enthalpy $\Delta^R G$ of 685.3 kJ/mol and a rest terminal voltage of 1.86 V in the case of liquid products and gaseous educts):

$$CH_3OH + \frac{3}{2}O_2 \rightarrow 2H_2O$$

As the electrochemical oxidation of methanol is inhibited, the cell voltages which are achieved at the present time are markedly below those which can be achieved when using hydrogen in a PEFC. A further problem is methanol permeation through the electrolyte with subsequent oxidation at the cathode. It results in mixed potential formation. Besides the voltage losses methanol permeation causes additional deteriorations in efficiency as the permeated amount of methanol is no longer available for current production. The power values of a DMFC are heavily influenced by the operating temperature and the pressure. Rising temperatures and higher oxygen partial pressures result in higher cell voltages. Methanol permeation however also increases with rising temperature.

Figure 1:
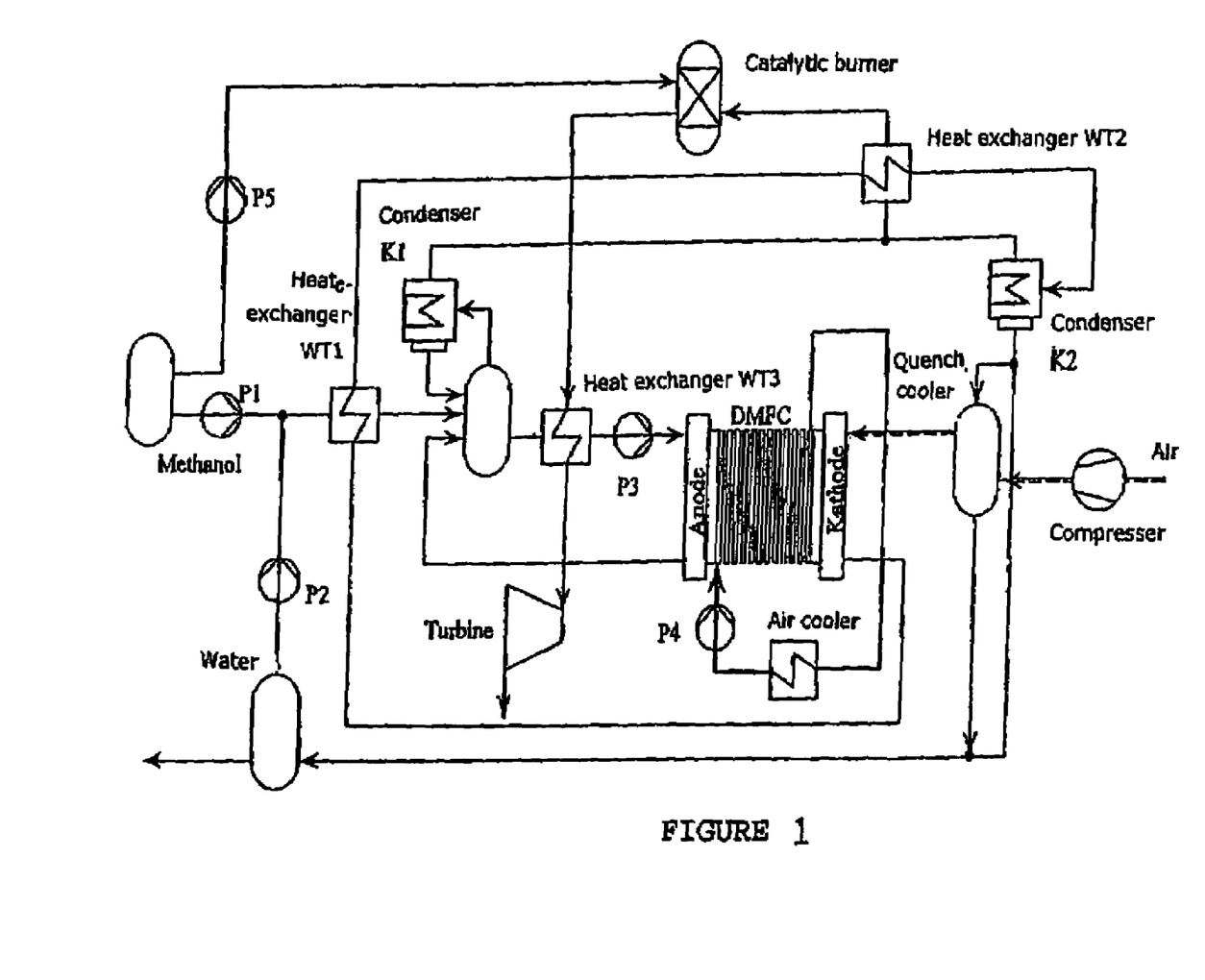

The structure in principle of the system is shown in FIG. 1. This does not involve a circuit which is optimised from the process engineering point of view. That however is also not necessary for the mode of consideration presented herein. Water and methanol, in the predetermined mixing ratio, are brought by means of pumps P1 and P2 to the operating pressure PFC of the cell and preheated in the heat exchanger WT1. The waste heat of the cathode waste gas is used for that purpose. The fuel mixture passes into a circulating tank and then raised to operating temperature in the heat exchanger WT3. The amount of heat required for that purpose is supplied by the waste heat downstream of the catalytic burner. The methanol/water mixture is then fed to the fuel cell. Any pressure losses are compensated with the pump P3.

Electrochemical reaction of the methanol takes place in the anode space of the fuel cell. The protons produced permeate through the diaphragm to the cathode. Carbon dioxide and any other by-products which may have occurred leave the anode space with the excess, unused fuel, and pass again to the circulating tank. Here the gaseous phase is separated off. In order to be able to recover the methanol in vapor form which is contained in the waste gas, the gas mixture is cooled in the condensate separator K1 and the condensate produced is fed to the circulating tank again.

FIG. 1 therefore shows an apparatus for a direct methanol fuel cell with a liquid fuel feed. At the cathode side the ambient air necessary for the reaction is compressed to the operating pressure PFC and then humidified with product water which occurs, in a quench cooler, to a state of saturation. In this case the air which is greatly heated by the compressing operation is cooled to below the cell operating temperature. The oxidation in the air reacts at the cathode, with absorption of the electrons, with the protons which have permeated through the diaphragm, to form water. The excess air leaves the cathode space with the reaction water. The cathode waste gas is cooled stepwise firstly in the heat exchanger WT2 and then in the condensate separator K2. The condensate which occurs is used in part for the air humidification procedure. The predominant amount of water however is used again as a starting material and fed mixed with methanol to the fuel cell.

The two waste gas flows which leave the condensate separators K1 and K2 are mixed and preheated in the heat exchanger WT2. They are fed to the catalytic burner. Here, any methanol, carbon monoxide or other hydrocarbon compounds, possibly contained in the waste gas, are reacted as completely as possible to form water and carbon dioxide. In order to achieve the operating temperature TCAT of the catalyst, which is necessary for that purpose, additional methanol possibly has to be supplied. To finish off the pressure energy of the waste gas is used in an expansion turbine downstream of the heat exchanger WT3.

Cooling of the cell is effected with water which is cooled after issuing from the cell in an air cooler. For the purposes of completely determining the heat transfer of the heat exchangers used in the system, a gradation of 5K is predetermined in each case. Heat losses were not taken into consideration, all components operate adiabatically. Further established boundary conditions are as follows:

| System parameters | |
|---|---|
| Turbine efficiency | 50% (adiabatic) |
| Pump efficiency | 80% |
| Compressor efficiency | 60% (adiabatic) |
| Pressure drop heat exchanger | 20 mbar |
| Pressure drop fuel cell | 50 mbar |
| Methanol concentration | 1M |
| Water drag coefficient | 4 $H_2O/H^+$ |

Besides the thermal balance sheet of the fuel cell stack, the quality of the system in terms of energy is also considered by means of the system efficiency. The system efficiency $\eta_{system}$ relates the electrical nett power of the fuel cell stack to the total chemical energy fed to the process:

$$\eta_{system} = \frac{P_{nett}}{\dot{n}_{methanol} \cdot H_{u,methanol}} \text{ with } H_{u,methanol} = 638.5 \text{ kJ/mol.}$$

In regard to specifying absolute power values they always relate to an amount of methanol fed to the system of 1 kmol/h (without the amount of methanol additionally required for the catalytic burner).

In regard to the calculations carried out, it was found that limitations in regard to the operating range of a DMFC with liquid fuel feed arise out of the thermal balance sheet of the fuel cell stack. The voltage efficiency $\eta_u$ of a fuel cell specifies in what relationship the chemical energy of the fuel mixture is converted into electrical power PFC and into heat. The waste heat generally necessitates cell cooling in fuel cell operation. The heat generated is however also partly carried away with the discharge air flow. The amount of heat which can be absorbed by the discharge air is determined by the condition with which the air passes into the cell and leaves it again. That can give rise to problems in terms of heat management of DMFC-fuel cell stacks with a liquid fuel supply. The cathode side sees evaporation not only of the reaction water but also the water which permeates through the diaphragm in the excess air and is present in liquid form on issuing from the cell, only in small amounts. If the enthalpy of evaporation required for the phase change can no longer be completely covered by the cell waste heat, heat would have to be fed to the fuel cell stack in order to hold it at operating temperature.

Figure 2:
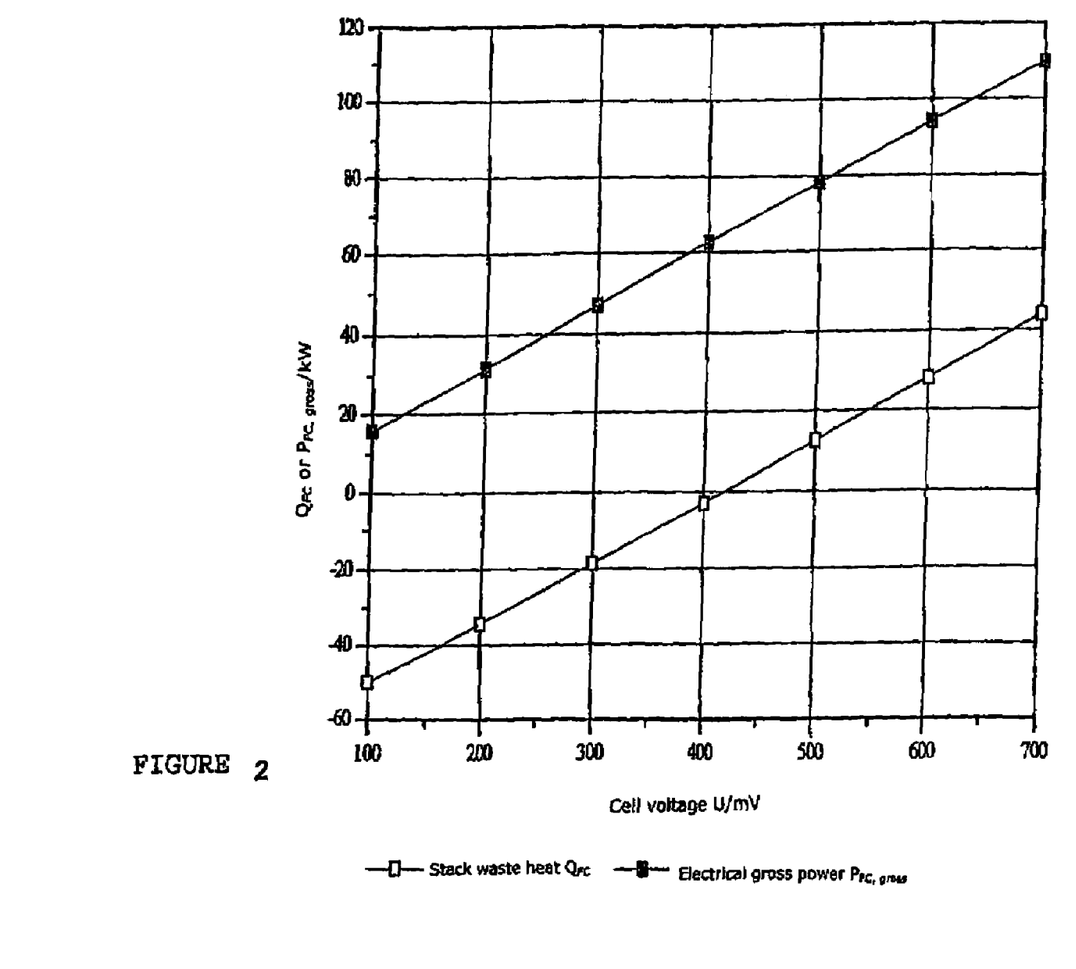

FIG. 2 shows the relationship between the electrical gross power of the cell and the waste heat. With increasing cell voltage the gross power rises linearly and the waste heat falls (definition: Q<0 corresponds to heat output). For the base circuit set forth herein and the corresponding operating parameters, the critical cell voltage as from which heat must be fed to the fuel cell stack is 420 mV.

FIG. 2 shows the relationship of the electrical gross power and the waste heat of a stack of direct methanol fuel cells with the following operating conditions: $T_{FC}=85°$ C., $P_{FC}=1.5$ bar, 1 M methanol, air ratio $\lambda= 2.5$, $H_2O_{perm}/H^+=4$, without taking account of methanol permeation from the anode to the cathode. The thermal economy of the fuel cell stack is accordingly influenced by a number of parameters. Considered hereinafter are the fuel cell operating temperature $T_{FC}$, the operating pressure $P_{FC}$, the air ratio $\lambda$ ($\lambda=n_L/n_{L,stoich.}$) and methanol permeation. The operating pressure is here the pressure obtaining on the anode and cathode side respectively ($P_{operation}=P_{cathode\ side}=P_{anode\ side}$). For $\lambda=1$ it is precisely the stoichiometric amount of air required that is supplied. With an air excess the overall reaction equation is as follows:

$$CH_3OH+(3/2)\ \lambda O_2 \rightarrow CO_2+2H_2O+(\lambda-1)(3/2)O_2.$$

In the calculations effected $\lambda$ always relates to the amount of methanol converted in the fuel cell. In this respect both the amount of methanol used for current production and also the permeating amount of methanol is taken into consideration.

Figure 3:
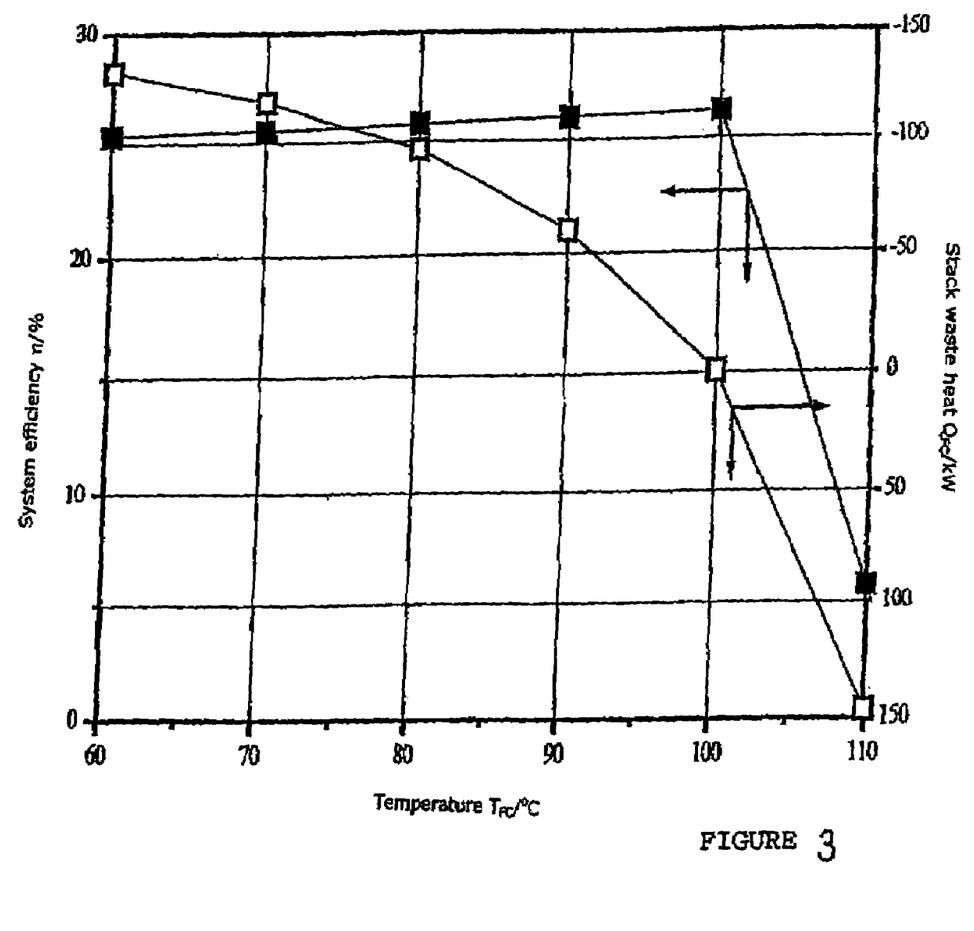

The influence of a temperature variation on the thermal economy of the fuel cell is illustrated in FIG. 3. A temperature increase has considerable effects on the cell waste heat. The amount of heat decreases exponentially with respect to rising temperature. The fuel cell waste heat is 132.2 kW at 60° C. and falls to a value of 60.4 kW at 90° C. At an operating temperature of 110° C. the fuel cell has scarcely any waste heat, in other words, with increasing operating temperature the cell would have to be heated in order to be able to hold the operating temperature constant, in other words, the potential system efficiency falls rapidly with temperature increases above 100° C. With an operating temperature of 110° C. the potential system efficiency is only 5.8%.

FIG. 3 shows the influence of the fuel cell stack temperature on the cell waste heat $Q_{FC}$ and the system efficiency with a constant cell voltage. The fuel cell stack operating conditions are: U=400 mV, PFC=2.4 bars, 1M methanol, $\lambda=2.5$, $H_2O_{perm}/H^+=4$, and $T_{cat}=150°$ C., without having regard to methanol permeation. In regard to the variation in operating temperature, a higher operating temperature of the catalytic burner was selected, in order to be able to have available sufficient heat in pre-heating of the fuel mixture in the heat exchanger WT3.

Figure 4:
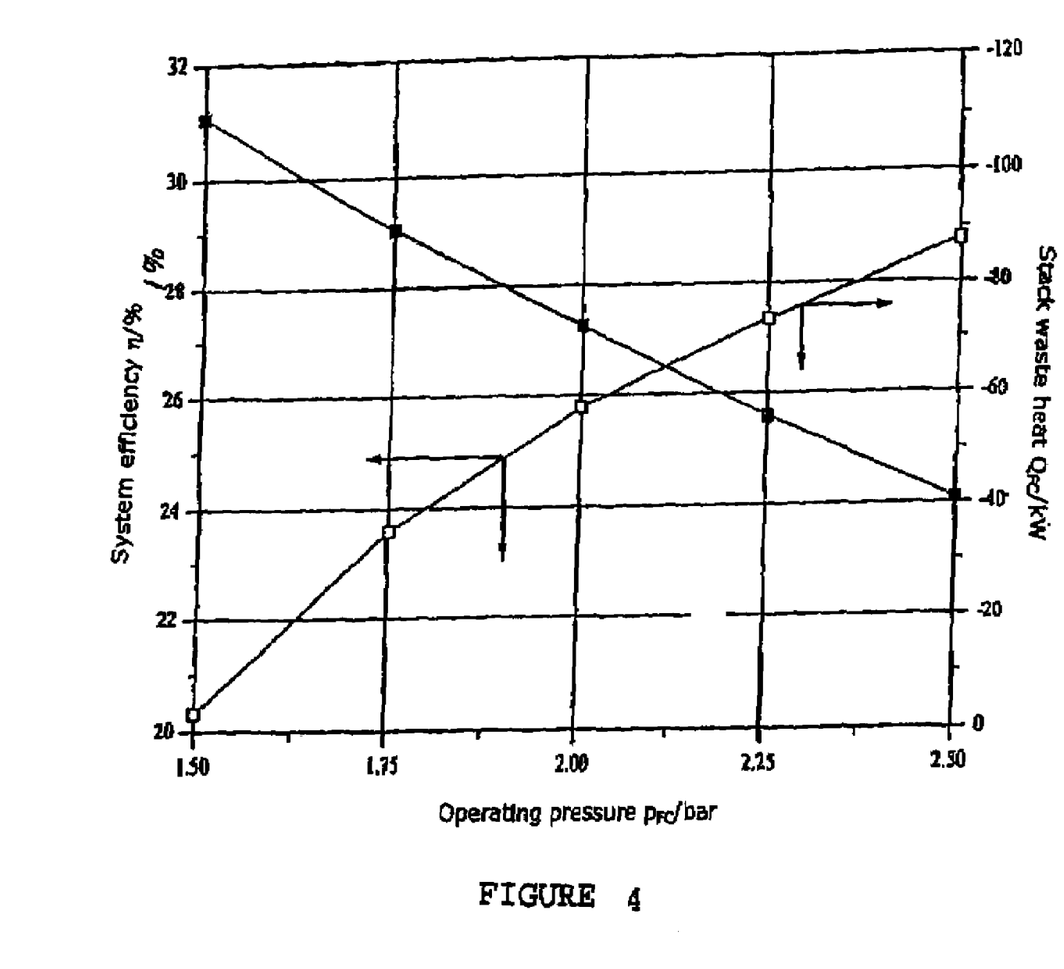

The pressure and in particular that on the cathode side has a crucial influence on overall efficiency. With rising pressure the specific demand required for the compressing step rises and system efficiency falls. It will be noted that a reduction in pressure gives rise to problems in terms of heat management. FIG. 4 shows that influence of pressure on the waste heat. With a fall in cathode pressure the waste heat of the fuel cell stack falls greatly.

FIG. 4 shows the influence of the cathode pressure on the fuel cell waste heat. The operating conditions of the fuel cell are: U=400 mV, $T_{FC}=$ 85° C., 1 M methanol, $\lambda=2.5$, $H_2O_{perm}/H^+=4$, and $T_{cat}=150°$ C., without having regard to methanol permeation.

Figure 5:
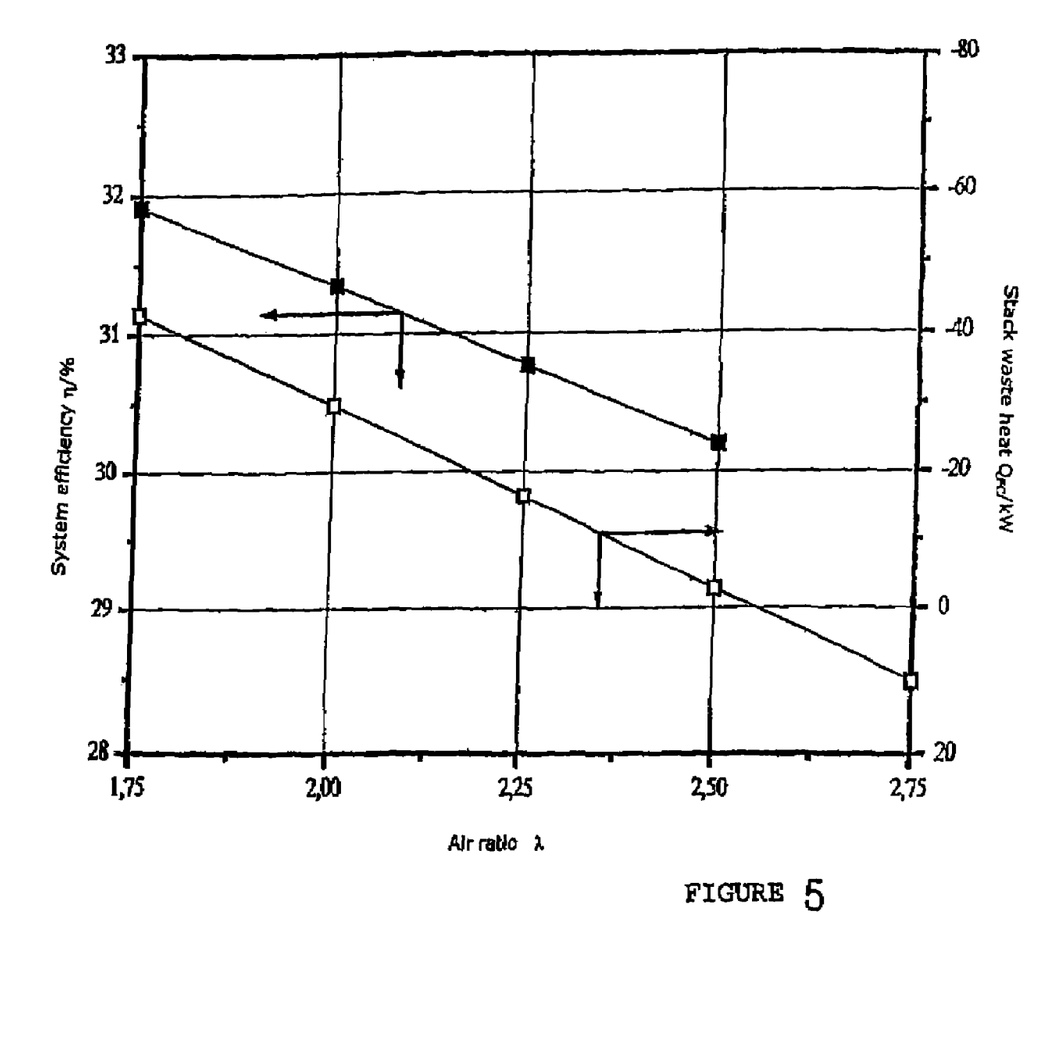

FIG. 5 shows the influence of the air ratio on the fuel cell waste heat. The operating conditions are: U=400 mV, $T_{FC}=85°$ C., $P_{FC}=1.5$ bar, 1 M methanol, $H_2O_{perm}/H^+=4$, and $T_{cat}=150°$ C., without having regard to methanol permeation.

The air ratio also influence the fuel cell waste heat, as can be seen from FIG. 5. The greater the amounts of air, the more heat can be discharged from the cell. As moreover the required compressor power greatly influences the level of system efficiency, that result emphasises the need to operate the fuel cell with low air ratios.

The permeation of methanol through the diaphragm was disregarded in the foregoing considerations as the reduction in permeation is a priority aim of further development endeavours. If consideration is given to the methanol permeability of the diaphragm, then upon complete oxidation of the permeating amount of methanol at the cathode the oxidation waste heat $\dot{q}_{Perm,Ox}$ is additionally liberated, and that influences the thermal economy of the fuel cell stack:

$\dot{q}_{Perm,Ox}=\dot{n}_{methanol,perm}\cdot H_u$

Figure 6:
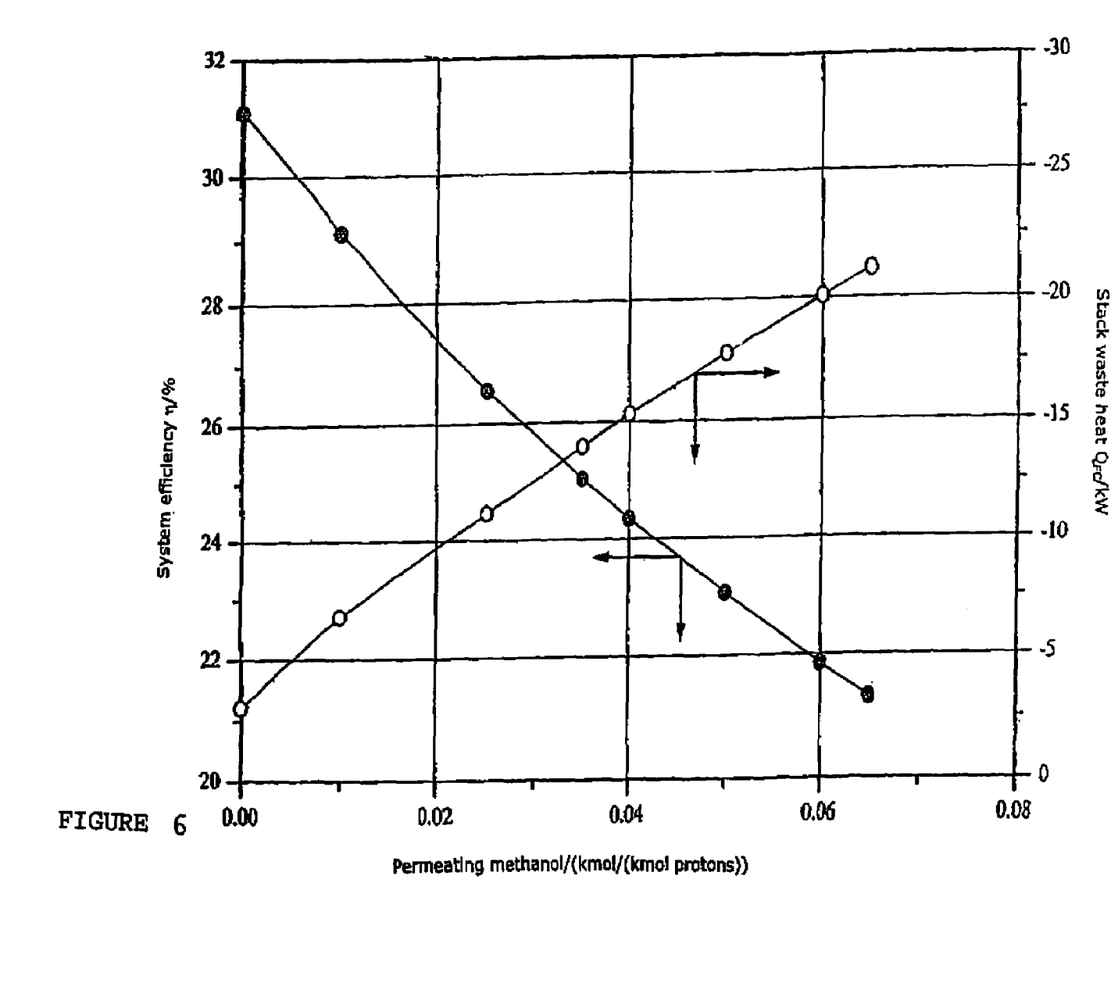

FIG. 6 shows the calculation results. It will be noted however that methanol permeation of 0.01 kmol/kmol protons, upon an increase in the waste heat by 2.5 kW, causes losses in terms of system efficiency of about 2% points.

FIG. 6 shows the influence of methanol permeation on thermal economy and system efficiency. The operating conditions are: U=400 mV, $P_{FC}=2.4$ bars, 1 M methanol, $\lambda=2.5$, $H_2O_{perm}/H^+=4$, and $T_{cat}=125°$ C.

Figure 7:
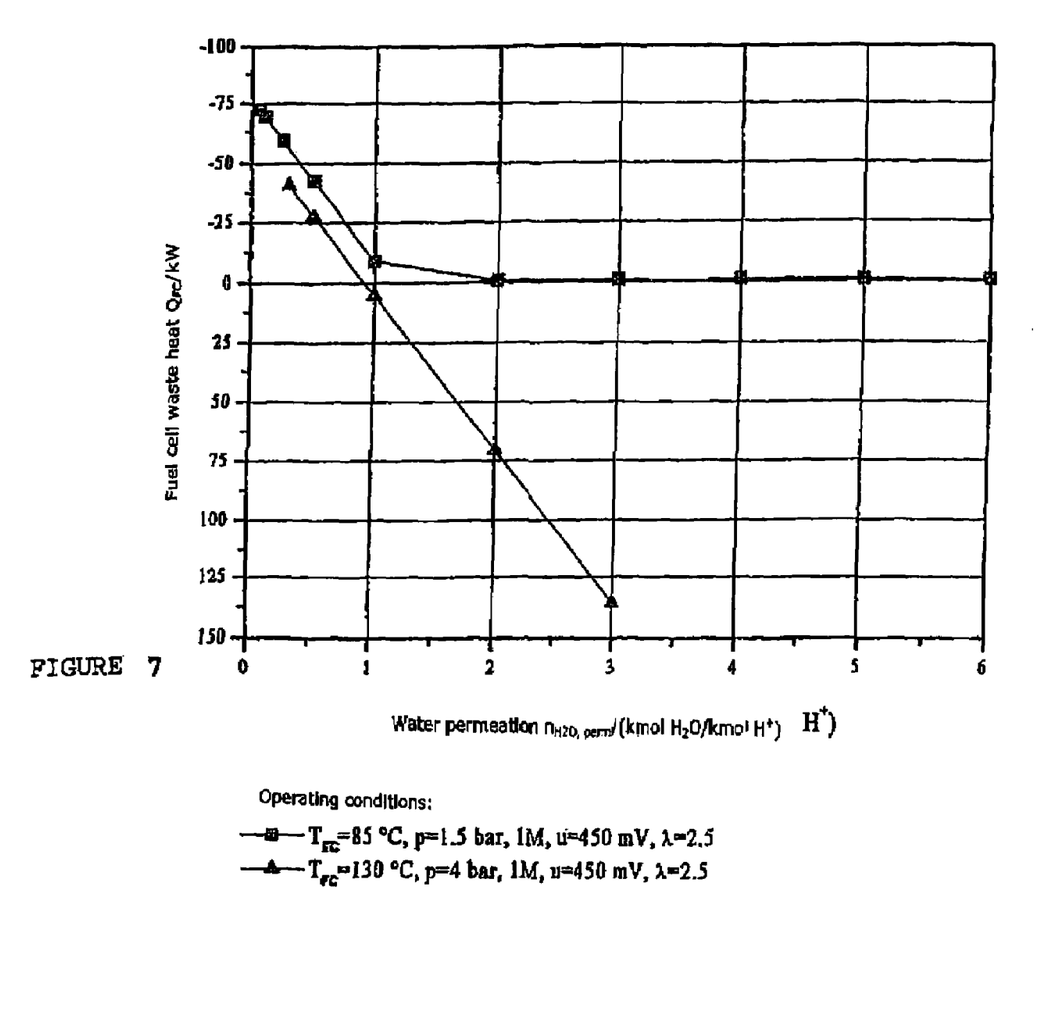

The results presented all relate to water permeation (from the anode to the cathode through the diaphragm) of 4 water molecules per proton. In addition, per proton, there is half a water molecule, due to the cathode reaction. A reduction in the amount of heat available in the cathode space for evaporation has a positive effect on the thermal balance sheet of the fuel cell stack. A methanol-impermeable barrier layer which allows no or only little water to pass therethrough could resolve the problem. FIG. 7 shows the influence of the permeating amount of water on the waste heat at two different operating points (without having regard to methanol permeation). Only the water reduction markedly below one molecule per proton brings the hoped-for rise in waste heat. It will be appreciated that, with operating conditions of that nature, there is the risk of the diaphragm drying out.

Figure 8:
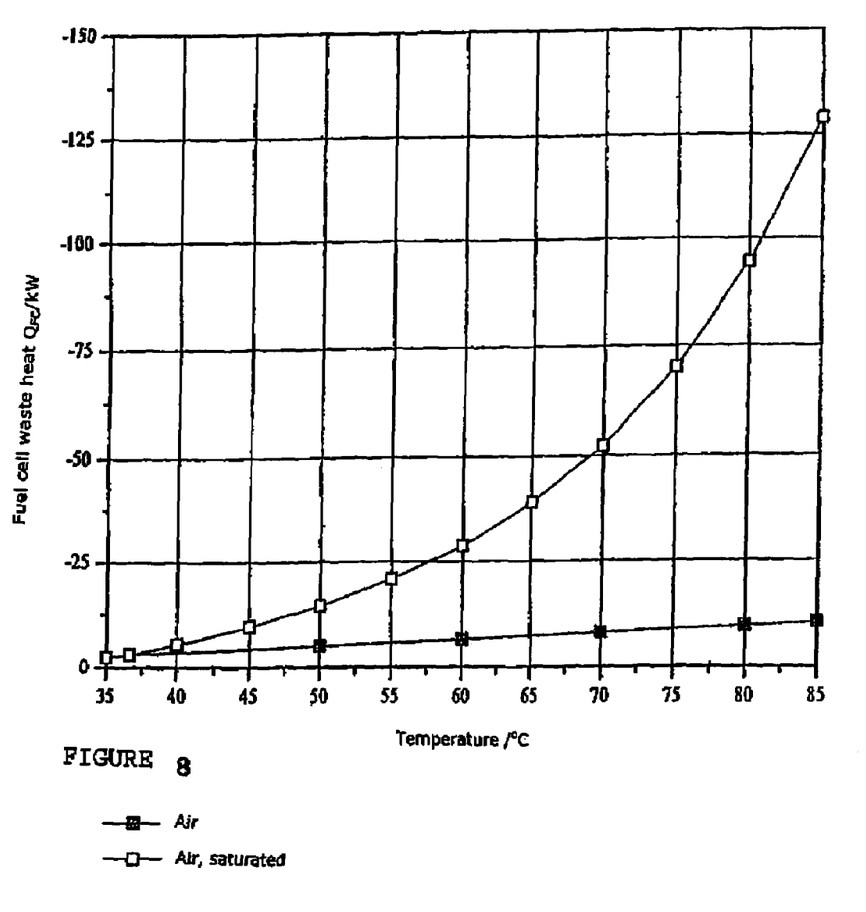

A possible way, in terms of process engineering, of limiting evaporation of the reaction water or the permeating water in the cathode space, involves more greatly preheating and humidifying the feed air. FIG. 8 shows the great increase in cell waste heat when the air humidifier temperature is raised. The air humidifier temperature was varied between 35° C. and 85° C. (FC-operating temperature). In addition consideration was given to pure preheating of the air saturated at 35° C. The increase in the air intake temperature without additional humidification has only slight effects on the thermal balance sheet of the fuel cell stack.

As the specific power values decrease with a rising air humidifier temperature, these proposals are not meaningfully appropriate. In regard also to system engineering, it has been found difficult to provide the amount of heat necessary for humidification and preheating, at the corresponding energy level, without a drop in system efficiency.

FIG. 8 shows the dependency of the fuel cell waste heat on the temperature of the supplied air, wherein the operating conditions are: $T_{FC}= 85°$ C., PFC=1.5 bar, 1 M methanol, U=400 mV; λ=2.5, and $H_2O_{perm}/H^+ = 4$.

It can be seen from the above-indicated details which parameters and in what fashion are to be particularly taken into consideration in regard to optimisation.

The aim of optimisation of the operating parameters is to maximise the system efficiency while at the same time minimising the required cooling demand of the fuel cell stack, having regard to the interactions between the individual parameters.

Figure 9:
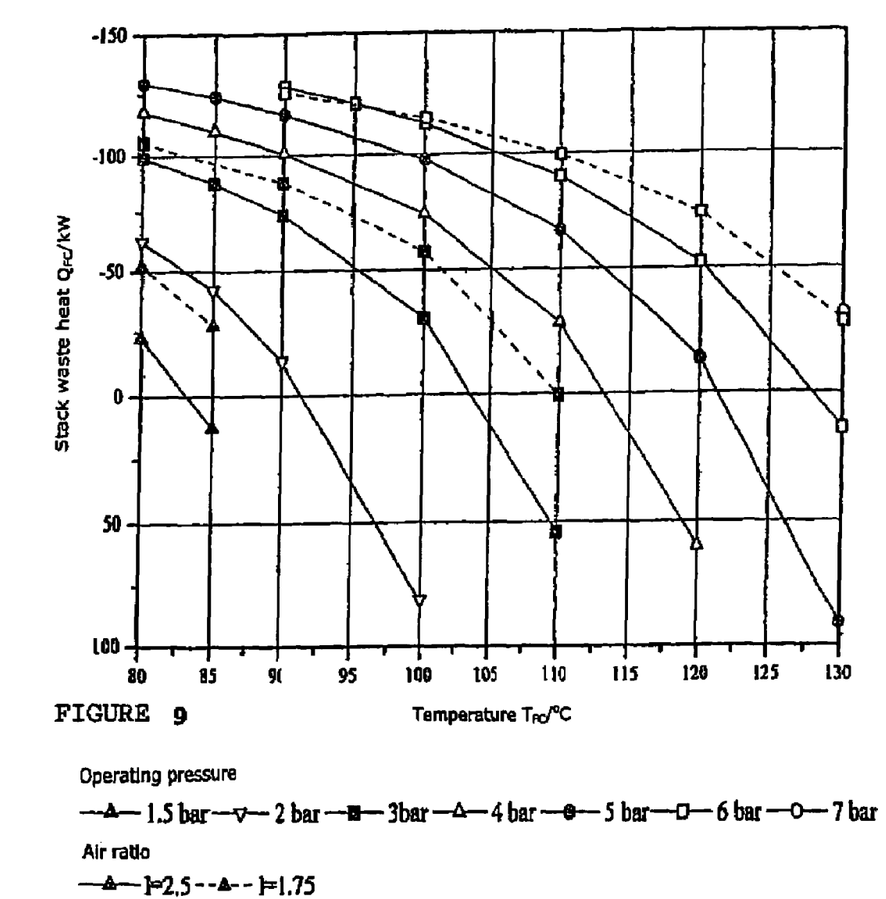

On the basis of the described influencing values, it is possible to ascertain for constant cell voltages, characteristic diagrams or mappings which define meaningful operating ranges for direct methanol fuel cell systems with a liquid fuel feed, in terms of the thermal balance sheet. FIG. 9 shows an example for a cell voltage of 500 mV. The requirement for a low cathode pressure in order to reduce the required compressor power, as a consequence, involves a low operating temperature of the fuel cells used. At a temperature of 110° C., with an air ratio of 1.75, the cathode pressure must be at least 3 bars so that the fuel cell stack can be operated at all. Operating temperatures of 130° C. are not meaningful from the system engineering point of view, even if they promise better power values for the fuel cell stack. They require a cathode pressure of about 6 bars and the electrical inherent demand for the air-compressing operation would drastically reduce the level of system efficiency. The described situation is worsened with increasing cell voltages and thus limits the permitted operating parameters, for varying operating points of the cell.

FIG. 9 shows an operating characteristic diagram or mapping of a liquid-operated DMFC at U=500 mV, wherein the operating conditions are: 1 M methanol, and $H_2O_{perm}/H^+ = 4$.

If now in an overall consideration, account is taken of the levels of system efficiency which can be achieved, it is possible to ascertain working windows in which operation is at its best, that is to say, little cooling requirement with high levels of efficiency.

Figure 10:
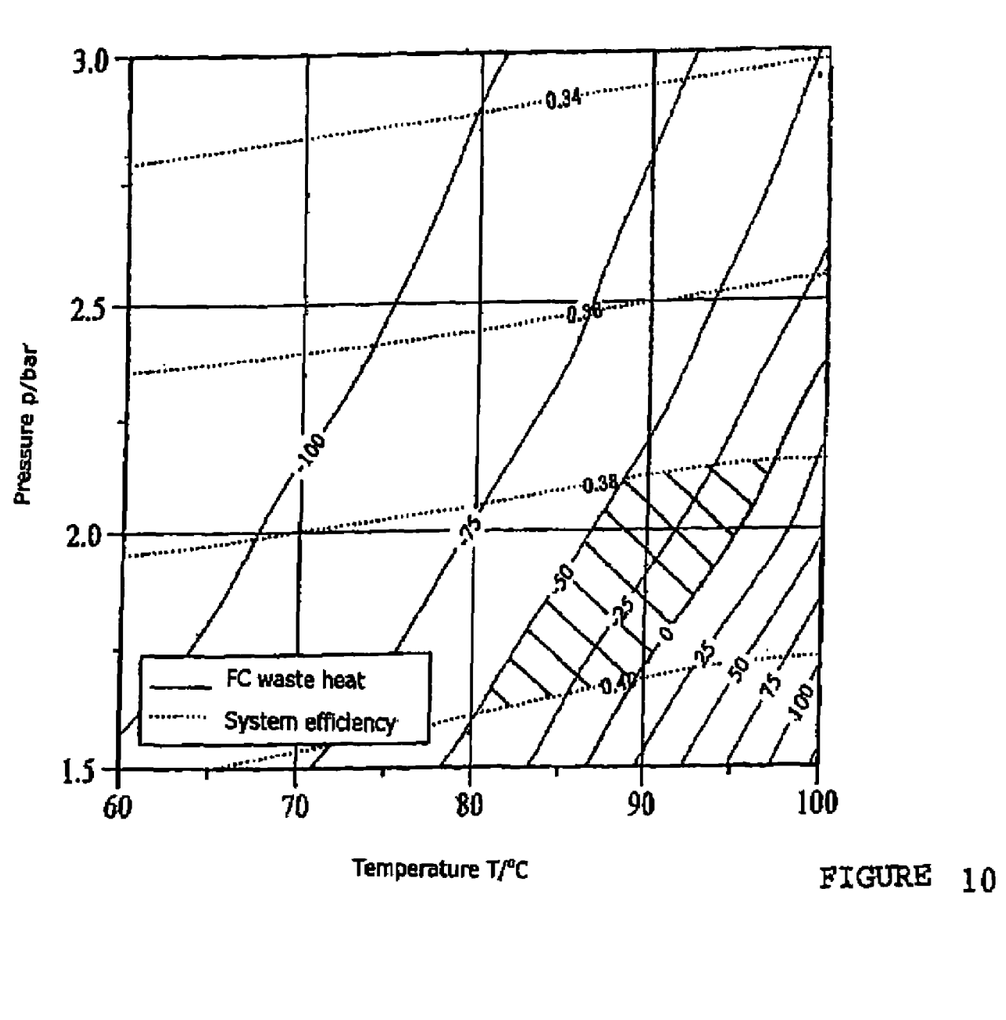

FIG. 10 shows the calculation results with a constant cell voltage. The highest levels of efficiency can be achieved with low operating pressures. The secondary condition of reducing the cooling requirement results in optimum operating conditions of around 86° C. and 1.6 bar.

Figure 11:
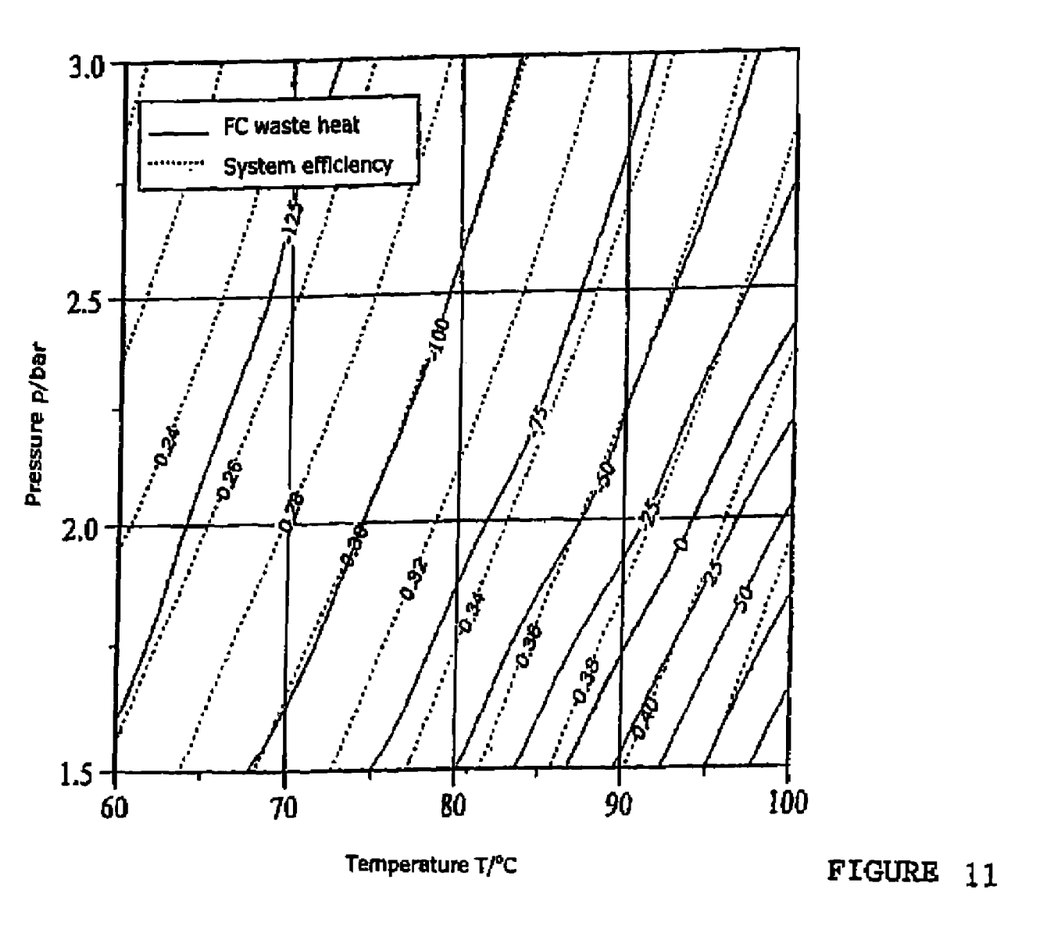

If the temperature and pressure dependency of the cell voltage is taken into consideration, the described optimum working window is shifted towards higher temperatures and pressures. The following illustrations clearly show that effect. FIG. 11 shows the results for a voltage increase of 5 mV with a rise in pressure of 1 bar or 5 mV with an operating temperature increase of 1K, starting from a reference point of 500 mV at 90° C. and 2 bars. In the case of a greater dependency on temperature and pressure, that shift is found to be even more pronounced (see FIG. 12).

FIG. 10 shows the operating characteristic diagram or mapping with a constant cell voltage U=500 mV, wherein the operating conditions are: 1 M methanol, $H_2O_{perm}/H^+=4$, $T_{cat}=150°$ C. and λ=2, without consideration being given to methanol permeation.

FIG. 11 shows an operating characteristic diagram or mapping with approximately temperature- and pressure-dependent cell voltages $U=f(T_{FC}, P_{FC})$ (5 mV/bar, 5 mV/K: with respect to the reference point U=500 mV at 90° C., 2 bars), (fuel cell stack operating conditions: 1 M methanol, $H_2O_{perm}/H^+=4$, $T_{cat}=150°$ C. and λ=2, without having regard to methanol permeation).

Figure 12:
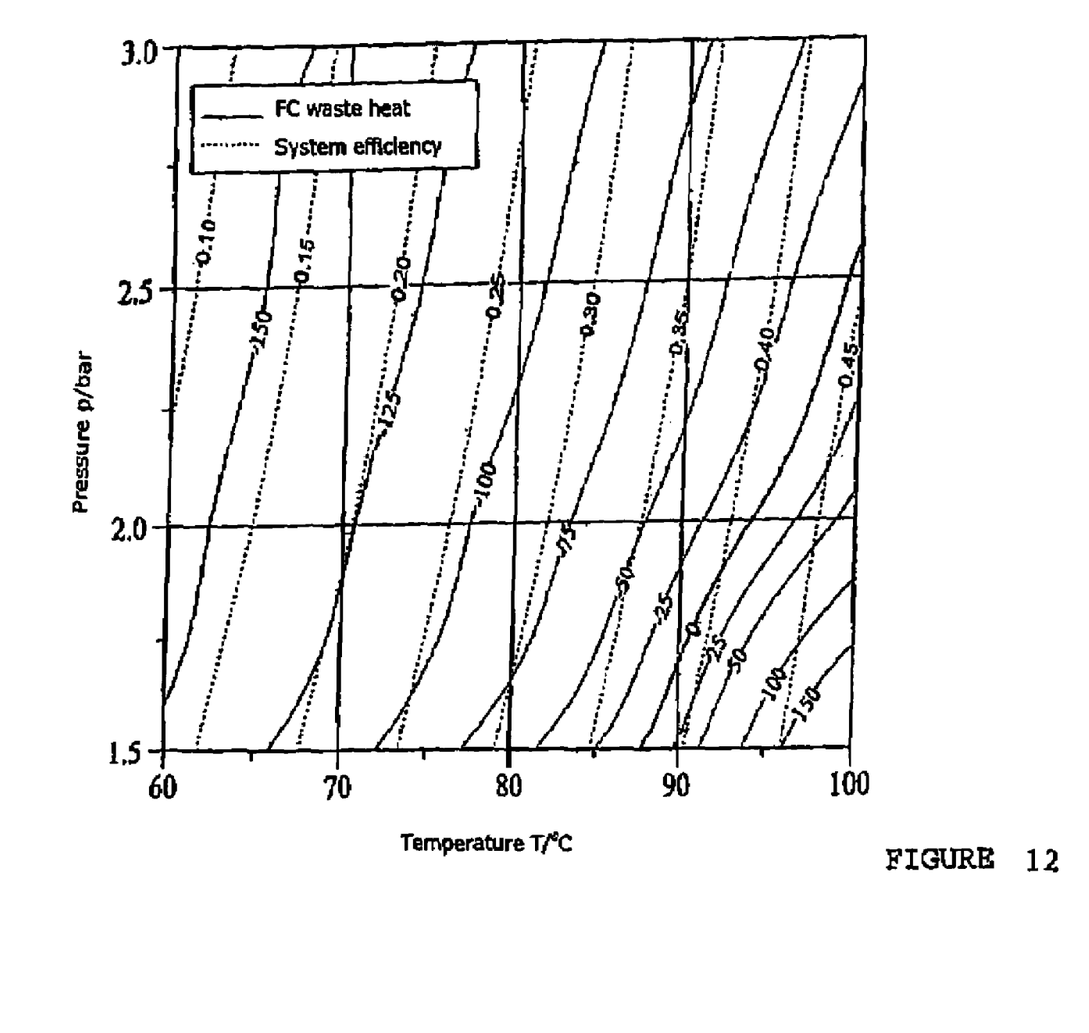

FIG. 12 shows an operating characteristic diagram or mapping with temperature- and pressure-dependent cell voltages $U=f(T_{FC}, P_{FC})$ (10 mV/bar, 10 mV/K: with respect to the reference point U=500 mV at 90° C., 2 bars), (fuel cell stack operating conditions: 1 M methanol, $H_2O_{perm}/H^+=4$, $T_{cat}=150°$ C. and λ=2, without having regard to methanol permeation).

In the following considerations account is also taken of methanol permeation in dependence on temperature. It has already been experimentally demonstrated that the permeating amount of methanol increases with rising operating temperature. The calculations give the following results. The levels of system efficiency which can be achieved markedly decrease. Overall, with constant voltages, the working range, with the highest levels of efficiency, is shifted towards low temperatures and pressures. It will be noted that, with those operating parameters, there is a high cooling requirement. The reduction in cooling requirement however is linked to losses in efficiency, as can be seen from FIG. 13.

Figure 13:
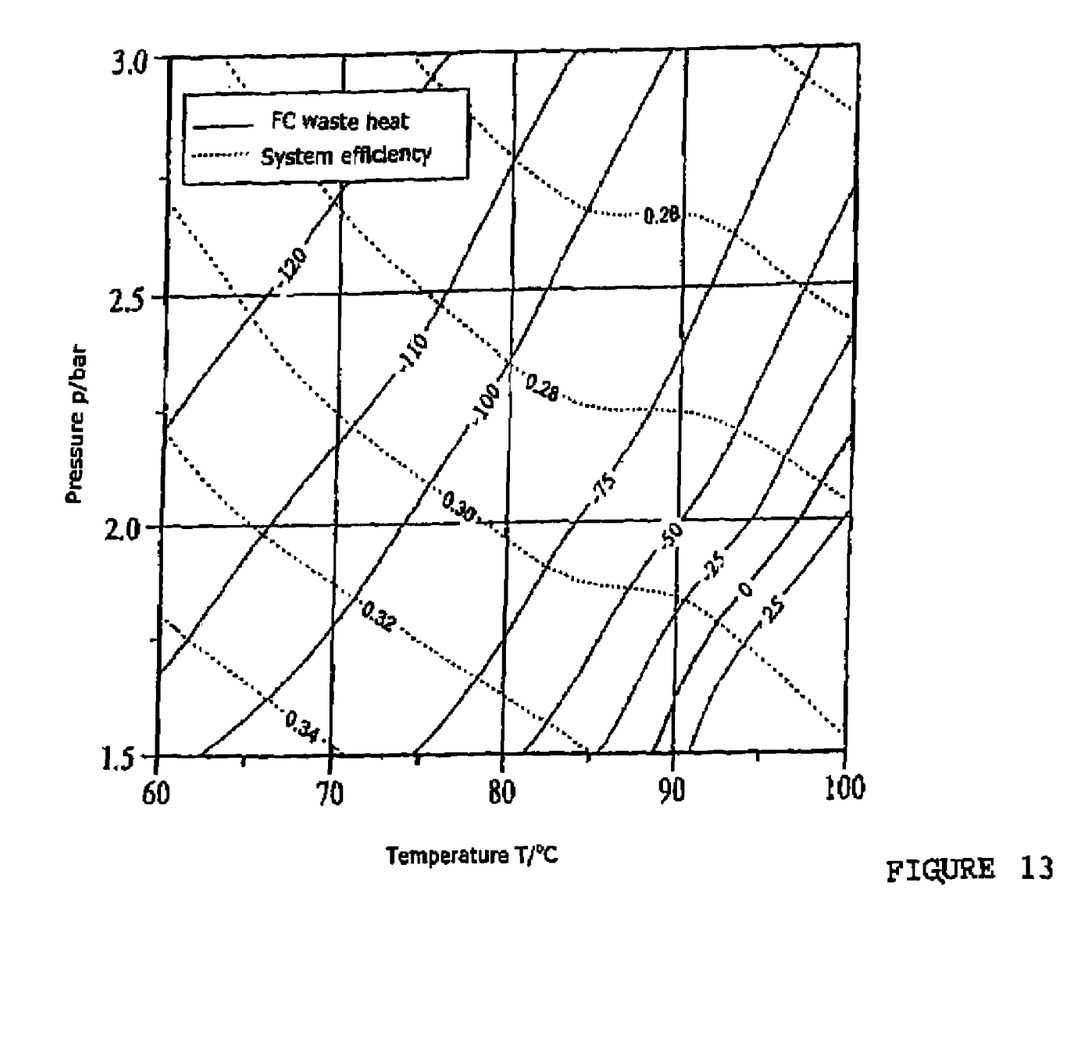

FIG. 13 shows an operating characteristic diagram or mapping with a constant cell voltage U=500 mV (fuel cell stack operating conditions: 1 M methanol, $H_2O_{perm}/H^+=4$, $T_{cat}=150°$ C. and λ=2, with consideration being given to methanol permeation in dependence on temperature).

The additional consideration set out hereinafter of the increase in voltage with a rising fuel cell stack temperature and a rising pressure (in this case for example a rise in voltage of 20 mV with a rise in pressure of 1 bar and 5 mV with an operating temperature increase of 1K, starting from a reference point of 500 mV at 90° C. and 2 bars) with at the same time methanol permeation being dependent on temperature results in optimum operating parameters being more clearly delimited. Low pressures, at temperatures above 85° C., result in the highest levels of system efficiency with at the same time a low level of required cooling power (see FIG. 14).

Figure 14:
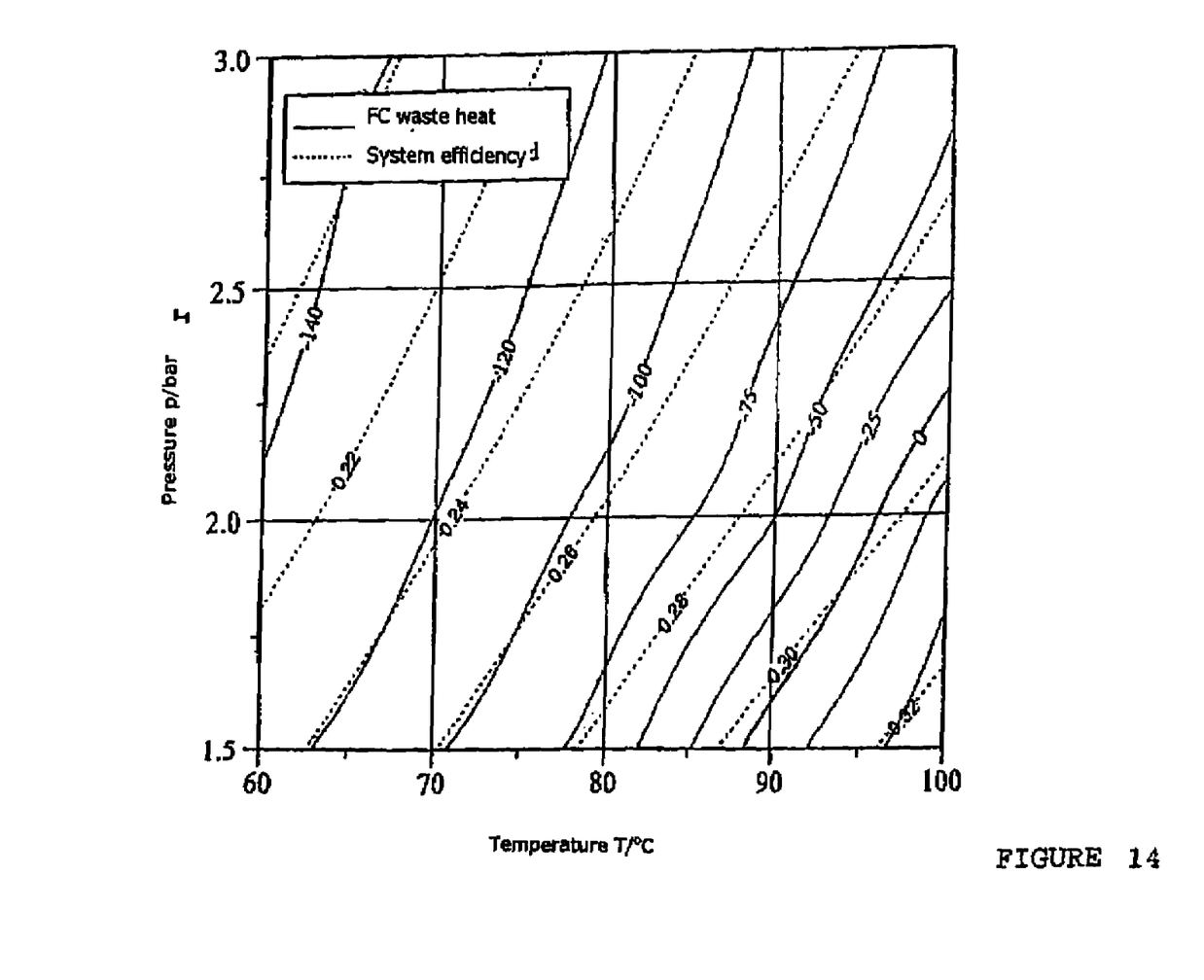

FIG. 14 shows an operating characteristic diagram or mapping at temperature- and pressure-dependent cell voltages $U=f(T_{FC}, P_{FC})$ (20 mV/bar, 5 mV/K: with respect to the reference point U=500 mV at 90° C., 2 bars) (fuel cell stack operating conditions: 1 M methanol, $H_2O_{perm}/H^+=4$, $T_{cat}=150°$ C. and λ=2, with consideration being given to methanol permeation in dependence on temperature).

Execution of the claimed method will now be made clear by reference to FIG. 10. Shown therein is an operating characteristic diagram or mapping of a low-temperature fuel cell at a constant cell voltage of 500 mV. The fuel used is a one kmol/h methanol.

Water permeation is 4 water molecules per proton. That means that, from the anode side, one water molecule passes through the diaphragm to the cathode side when at the same time 4 protons pass through the diaphragm.

In the operating characteristic diagram or mapping of FIG. 10, the pressure obtaining on the cathode side is plotted against temperature. The dotted lines in FIG. 1 show the variation in levels of system efficiency which can be achieved. The rising solid lines give the excess heat produced by the fuel cell, that is to say the waste heat. Emphasised in bold is the line at which the waste heat=0. As viewed to the left of that bold line, waste heat is produced by the fuel cell. An excess amount of waste heat is here specified by negative numbers. To the right of the bold line heat must be supplied externally to the fuel cell, for operation thereof.

Hereinafter the basic starting point adopted is a maximum level of system efficiency, which can be achieved in practice, for the fuel cell, of 0.4, that is to say 40%. Let the electrical power generated by the fuel cell be 100 KW. A window is shown in the Figure by hatching. The window embraces waste heat values of between 0 and 50 KW (as the negative numbers reproduce the waste heat in KW). The window also extends from a system efficiency of 0.4 to 0.36. Consequently it extends from the maximum level of system efficiency which can be achieved in practice, to a level of system efficiency which is 10% lower than the maximum value which can be achieved in practice.

Now, in accordance with the invention, the pressure and temperature are to be so selected that they are in the region of the window. For example the temperature can be 90° C. and the pressure obtaining on the cathode side can be 2.0 bars in order in accordance with the invention to arrive at good operating conditions.

FIG. 11 shows how the operating characteristic diagram or mapping can change when other conditions vary. In this case the graphs for system efficiency and for waste heat extend substantially parallel. Instead of a closed window the result is then a strip which is crucial in terms of the selection of pressure and temperature.

In principle the method can also be provided for gaseous fuels. It will be noted however that a fuel cell stack operated with gaseous methanol always has to be cooled. Waste heat therefore does not arise as a boundary condition of the optimisation problem. Under those conditions the teaching according to the invention relates to fuel cells which are operated with liquid fuel.

What is claimed is:

1. A method of setting operating conditions in a low-temperature fuel cell for producing electrical power, which is operated with liquid fuel and having a cathode side, a pressure, and an operating temperature comprising:

setting the pressure on the cathode side, and setting the operating temperature wherein said pressure and said temperature are selected such that the maximum system efficiency which can be achieved in practice is substantially attained, and wherein the fuel cell produces an amount of waste heat which is substantially below the amount of electrical power produced by the fuel cell.

2. A method as set forth in claim 1, comprising:

plotting the pressure is against temperature with a constant voltage for the fuel cell in a diagram, entering characteristics for the system efficiency and for the waste heat in the diagram, selecting a range in the diagram such that said range includes waste heat values between zero and half the amount of electrical power produced by the fuel cell and further includes levels of system efficiency which are between the maximum system efficiency which can be achieved in practice and 90% thereof, and selecting a pressure-temperature pair from that range as cathode pressure and operating temperature for the fuel cell.

* * * * *